Jan. 21, 1958  B. G. HEDEEN  2,820,626
BRACE ROD
Filed March 9, 1956
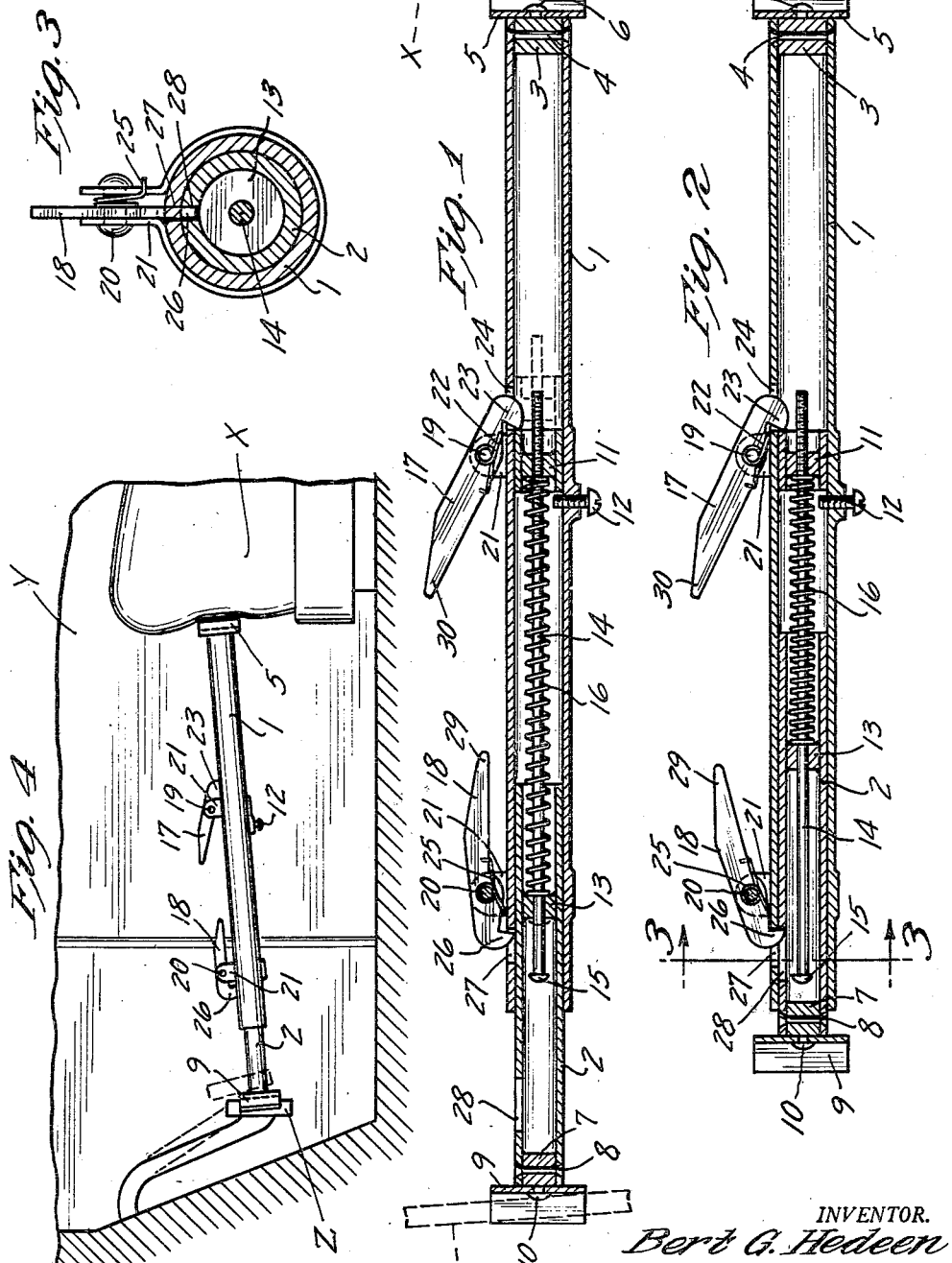
INVENTOR.
Bert G. Hedeen
BY
Merchant & Merchant
ATTORNEYS

United States Patent Office 2,820,626
Patented Jan. 21, 1958

2,820,626

BRACE ROD

Bert G. Hedeen, St. Paul, Minn.

Application March 9, 1956, Serial No. 570,460

6 Claims. (Cl. 267—1)

My invention relates generally to extensible and retractable brace rods and more particularly to the type which may be interposed between spaced objects for the purpose of exerting yielding pressure thereagainst.

The primary object of my invention is the provision of a device of the class above described comprising a pair of telescoping brace rod sections which are normally spring biased toward their extended positions (wherein the space between their object abutting free ends is greater than the distance between objects between which my brace rod is normally intended to be operatively positioned) in further combination with releasable means for locking the said telescoping sections in a retracted position, wherein the space between said object abutting free ends is less than the space between the objects against which said sections are intended to exert yielding bias. By this arrangement my novel structure may be reduced in longitudinal dimensions to a point where the over-all length thereof is less than the space between the two objects between which the device is intended to exert yielding bias (for example, the driver's seat of an automotive vehicle and the brake pedal of said vehicle) at which time the device may be extended so as to cause the free ends of the sections to exert yielding bias against both of said objects, by releasing of said locking means.

A further object of my invention is a provision of a device in the class immediately above described wherein means is provided for releasing the yielding bias exerted against said telescoping sections, when said sections are in operative object engaging positions, whereby to greatly facilitate removal of said brace rod from between said two objects.

A further object of my invention is a provision of a device of the class described which is relatively inexpensive to produce, which has relatively few working parts, and which is rugged and durable in construction.

A further object of my invention is a provision of a device of the class described which is extremely simple and positive in its operation, is light in weight and which has a large number of uses.

The above and still further objects of my invention will become apparent from the following detailed specification, appended claims, and attached drawings.

Referring to the drawings, wherein like characters indicate like parts throughout the several views:

Fig. 1 is a view partly in vertical axial section, and partly in side elevation;

Fig. 2 is a view corresponding to Fig. 1 but showing a different position of some of the parts;

Fig. 3 is an enlarged view in transverse section taken on the line 3—3 of Fig. 2; and Fig. 4 is a fragmentary view in side elevation of an automotive vehicle showing my device in operative position.

Referring with greater particularly to the drawings, my novel device consists of a pair of inner and outer tubular telescoping sections 1 and 2 respectively, the former being relatively long with respect to the latter. The axially outer end of section 1 is closed by a plug 3 which is secured in position by a rivet 4 extending diametrically therethrough and through the walls thereof. An enlarged object engaging foot 5 is secured to the plug 3 by means of a rivet or the like 6. The axially outer end of the relatively inner tubular section 2 is likewise closed by means of a plug 7 and rivet 8; and an enlarged object engaging foot 9 is similarly secured to the plug 7 by a rivet or the like 10.

A shoe element 11 is mounted for longitudinal sliding movements within the outer tubular section 1 between a set screw 12, which limits axially inward movement thereof, and the plug 3. A crosshead element 13 is non-movably secured to the relatively short tubular section 2, intermediate the ends thereof. An elongated rod 14 extends through an axial opening in the shoe 11 at one end and has screw threaded engagement therewith. At its opposite end the rod 14 extends slideably through a central aperture in the crosshead 13 and terminates therebeyond in an enlarged head 15 which limits axially inward movements of the rod 14 with respect to the crosshead 13. Encompassing the guide rod 14 and interposed between the shoe 11 and crosshead 13 is a coil compression spring 16 which normally biases same apart.

Mounted on the outer tubular section 1 in opposed longitudinally spaced relationship, are a pair of latch hooks 17 and 18. As shown, the latch hooks 17, 18 extend generally longitudinally of section 1 and are pivotally secured intermediate their ends, as at 19 and 20 respectively between radially outwardly projecting bearing bracket forming ears 21. A torsion spring 22 biases the hook acting head 23 of hook element 17 toward passage through an opening 24 in the wall of the tubular casing 1 whereby it will engage and limit axial outward movement of sliding shoe 11 therewithin as shown in the full line in Fig. 1 and is also shown in Fig. 2.

The latch hook 18 is biased by a torsion spring 25 toward position to cause passage of its hook acting head 26 through an opening 27, and likewise through an opening 28 in the wall of the relatively short section 2 when the opening 28 is aligned with the opening 27, as shown in Fig. 2. As there shown, the coil spring is under considerable compression.

When it is desired to utilize my above described novel brace rod, same is cocked (in the retracted position of Fig. 2) as follows: First, the inner sections 1 and 2 are extended axially outwardly to a point where the head 15 on the rod 14 engages the crosshead 13, whereby to move the shoe 11 axially inwardly beyond the hook acting head 23 of the latch hook 17. In other words, the shoe 11, is moved from the dotted line to the full line position of Fig. 1. Thereafter the inner tubular section 2 is moved axially inwardly to cause alignment between opening 28 therein and opening 27 in the outer tubular section 1. The parts are now in the position illustrated in Fig. 2 in which the space between the feet 5, 9 carried by the respective sections 1, 2, is less than the space between the objects between which the device is intended to exert yielding bias (in this case, the driver's seat X of a vehicle Y and the brake pedal Z thereof). When the parts are so positioned, my device is placed loosely between said objects (in this case the objects being X and Z) with the feet 5, 9 in alignment therewith. To cause engagement of the feet 5, 9 with the objects X, Z, respectively, the lever acting inner end 29 of the latch hook 18 is depressed so as to cause the hook acting end 26 thereof to be lifted out of the opening 28. The parts then assume the full line position of Fig. 1 with the coil spring 16 still under considerable compression.

When it is desired to remove my novel structure from between the objects X, Z, it is but necessary to depress the inner end 30 of the latch hook 17 whereby to cause passage of the shoe 11 axially outwardly therebeyond, to the dotted line position of Fig. 1. By this means the compression is completely removed from the spring 16 and the tubular sections 1, 2 are left free for axial sliding movements until cocked again in the manner above described.

While I have shown my device in use as a safety tool, to positively lock a vehicle through the means of its more efficient foot brakes (so as to facilitate tire changing and the like), it should be obvious that same has multifarious uses; and while I have shown a preferred embodiment thereof of my invention, it should be obvious that same is capable of modification without departure from the scope and spirit of the appended claims.

What I claim is:

1. In a device of the class described, cooperating inner and outer tubular telescoping sections, a shoe element axially slideably mounted in one of said sections, a non-movable crosshead element within the other of said sections, a rod secured fast to one of said elements and extending slideably through the other thereof, a coil spring around said rod and interposed between said elements, a pair of opposed longitudinally spaced latch hooks mounted on said outer section, one of said latch hooks working through an opening in the wall of said outer section and engageable with said shoe element to limit axial movement thereof in an inward direction, the other of said latches working through an opening in the wall of said outer section and being engageable with a portion of the inner section to lock the inner section against axially outward movement with respect to the outer section, said spring being under compression when each of the latches is in an operative locking position and biasing said elements apart.

2. The structure defined in claim 1 in further combination with an enlarged object-engaging foot on the outer end portions of each of said sections.

3. The structure defined in claim 1 in further combination with means positively limiting axial movements of the shoe in the opposite direction, and means on the free end of said rod limiting sliding movements of said other of said elements therebeyond.

4. In a device of the class described, cooperating inner and outer telescoping sections, an enlarged object-engaging foot on outer ends of each of said sections, a shoe axially slideably mounted in said relatively long outer section, a non-movable crosshead in the intermediate portion within the relatively short inner section, a rod secured fast to said shoe and extending slideably through said crosshead and provided at its free end with an enlarged head limiting axially inward sliding movements thereof beyond said crosshead, a coil compression spring interposed between said shoe and said crosshead and encompassing said rod, a pair of opposed pivoted latch hooks mounted on said relatively long outer section, one of said latch hooks working through an opening in the wall of said outer section and engageable with said shoe to limit axial movement thereof with said shoe element in an inward direction, and the other of said latches engageable with an abutment on said inner section to lock same against axial outward movement with respect to said outer section, said spring being under compression when each of said latches is in its operative locking position and biasing said shoe and crosshead apart.

5. In a device of the class described, cooperating inner and outer tubular telescoping sections, a shoe element axially slideably mounted in one of said sections, a non-movable crosshead element within the other of said sections, a rod secured fast to one of said elements and extending slideably through the other thereof, a coil spring around said rod and interposed between said elements, a pair of opposed longitudinally spaced latch hooks mounted on said outer section, one of said latch hooks working through an opening of a wall of said outer section and engageable with said shoe element to limit axial movement thereof in an inward direction, the other of said latches being engageable with a portion of the inner section to lock the inner section against axially outward movement with respect to the outer section, said spring being under compression when each of the latches is in an operative position and biasing said elements apart, in further combination with means yieldingly biasing said latch hooks toward operative positions.

6. The structure defined in claim 5 in which said rod is provided with means limiting axial inward movements thereof with respect to said crosshead, and in which the connection between said rod and said one of said elements permits adjustability to vary the effective length thereof.

References Cited in the file of this patent

UNITED STATES PATENTS

| | | |
|---|---|---|
| 1,681,192 | McBride | Aug. 21, 1928 |
| 2,436,800 | Fryzel et al. | Mar. 2, 1948 |